L. M. BOOTH.
APPARATUS FOR STARTING EXPLOSIVE ENGINES.
APPLICATION FILED SEPT. 27, 1906.
909,140.
Patented Jan. 12, 1909.
2 SHEETS—SHEET 1.
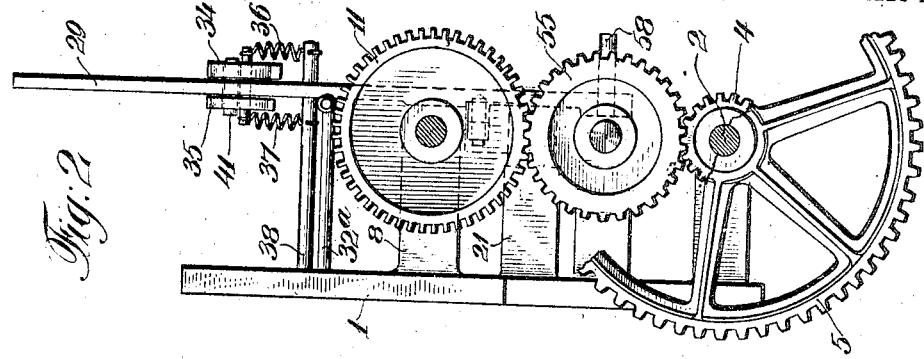

L. M. BOOTH.
APPARATUS FOR STARTING EXPLOSIVE ENGINES.
APPLICATION FILED SEPT. 27, 1906.
909,140.
Patented Jan. 12, 1909.
2 SHEETS—SHEET 2.
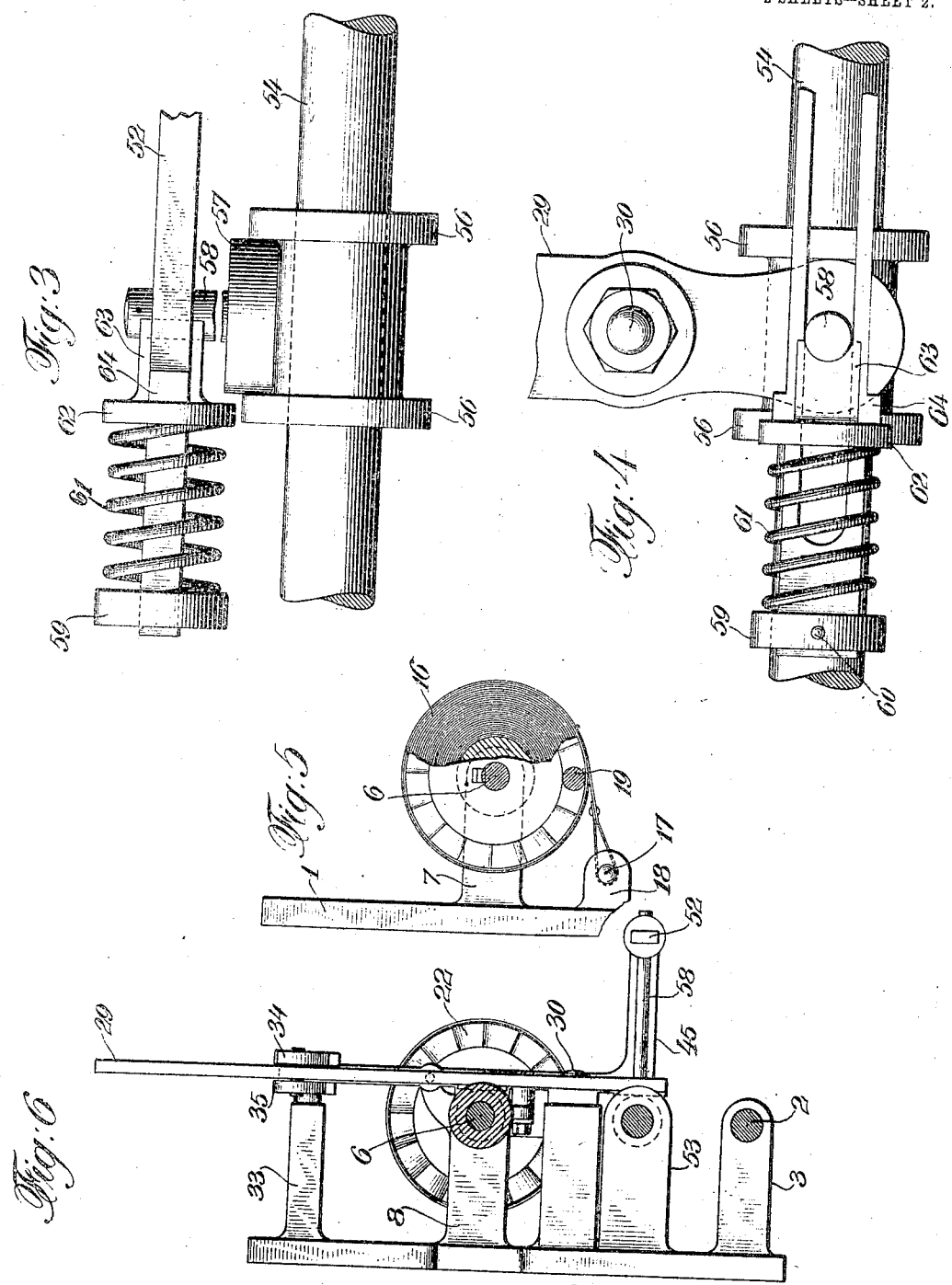

UNITED STATES PATENT OFFICE.

LEVIS MILLER BOOTH, OF PLAINFIELD, NEW JERSEY.

APPARATUS FOR STARTING EXPLOSIVE-ENGINES.

No. 909,140.

Specification of Letters Patent.

Patented Jan. 12, 1909.

Application filed September 27, 1906. Serial No. 336,395.

*To all whom it may concern:*

Be it known that I, LEVIS MILLER BOOTH, a citizen of the United States, residing at Plainfield, Union county, New Jersey, have invented a certain new and useful Improvement in Apparatus for Starting Explosive-Engines, of which the following is a specification.

The object of my invention is to provide a simple and effective apparatus for starting explosive engines, and the particular features of my invention are described in the following specification and pointed out in the appended claims.

In the accompanying drawings: Figure 1 is an elevation of my apparatus. Fig. 2 is an end view partly broken away showing a portion of the apparatus. Fig. 3 is a bottom view partly broken away of an enlarged detail of the means employed for throwing the gears out of engagement. Fig. 4 is a side elevation of an enlarged detail of the device employed for throwing the gears out of engagement, partly broken away. Fig. 5 is an end view partly broken away showing the power spring. Fig. 6 is an end view partly in section showing a portion of the apparatus.

Similar references refer to similar parts throughout the specification.

The supporting plate upon which the apparatus is mounted I have designated by the numeral 1.

2 is an extension of the crank shaft of the engine, the forward end of which is journaled in a suitable bearing 3. This shaft carries two spur gears 4 and 5 which are mounted on the shaft near the forward end thereof. Mounted parallel thereto and above the shaft 2 is a shaft 6, which is journaled in suitable bearings 7 and 8, which are supported on the plate 1.

On either end of the shaft 6 are secured by means of set screws 9 retaining collars 10, which prevent the shaft 6 from sliding longitudinally in its bearings and maintain it in fixed relation to the shaft 2. On the other end of the shaft 6 is slidably mounted a spur gear 11 provided with an elongated hub 12, which is feathered to the shaft 6 so as to rotate in unison with it and can be moved longitudinally on the shaft 6. The inner end of the hub 12 is provided with an annular recess 13, the purpose of which will be hereafter explained. On the other or inner end of said shaft 6 is mounted a ratchet disk 14 provided with an elongated hub 15 secured to the shaft 6 so as to rotate in unison with it.

A strong spring 16 is coiled about the hub 15, the inner end of the spring being securely fastened to the hub. The other end of the main or power spring 16 is attached to the bed plate or support 1 by means of the pin 17, which is secured in eyes 18 in the support 1. A pawl 19 is mounted in eyes 20 and 21 on the supporting plate 1, and this pawl 19 is forced into engagement with the ratchet teeth 22 on the disk 14 by means of a coil spring 23, which is mounted on the pawl 19 between the eye 21 and a collar 24, which is secured to the pawl 19 by a pin 25. The collar 24 is provided with an extension 26, through a circular opening in which is secured a connecting rod 27 by means of a nut 28. The other end of the rod 27 is pivoted at 28 to the operating lever 29, which is pivoted at 30 to the supporting plate 1, the construction being such that when the lever 29 is forced forward, the spring 23 is compressed and the pawl 19 is forced out of engagement with the ratchet teeth 22.

Above the pivotal point 30 on the operating lever 29 is mounted a roller 31 as shown in the dotted line in Fig. 1 so as to fit into the recess 13 and engage with the hub 12, thereby causing the spur gear 11 and its hub 12 to shift forward and backward on the shaft 6 by the movement of the lever 29. Secured at one end to the lever 29 and at the other end to a pin 32ª mounted in the supporting plate 1 is a coil spring 32 which is constantly under tension and tends to pull the lever 29 backward.

On a stud 33 projecting outward from the supporting plate 1 are pivotally mounted parallel to each other two latches 34 and 35, to which are respectively attached coil springs 36 and 37. The other ends of the springs 36 and 37 are secured to a pin 38 mounted in the supporting plate 1. These springs are constantly under tension and tend to force the forward ends of the latches downward. The latches 34 and 35 are also provided at their outer ends with slots, the latch 34 having a lock notch 39 at the outer end of its slot, and the inner latch 35 having a lock notch 40 at the inner end of its slot, and the lever 29 is provided with a pin 41 which passes through the slots in the latches 34 and 35, the construction being such that when the lever 29 is forced to its extreme forward position, the pin 41 will engage with the lock notch 39, and secure the lever in the forward position, and when the lever 29 is forced to the extreme rear position, the pin 41 will engage with the lock notch 40 and secure the lever in this position. It is also apparent that when the lever 29 is forced into the extreme forward position, the spur gear 11 will also be forced forward and into engagement with the spur gear 5 as shown in the dotted lines in Fig. 1, and when the lever is forced to the extreme rear position, the spur gear 11 will be forced backward into the position shown in the dotted lines in Fig. 1, the latches 34 and 35 automatically locking the lever in the extreme forward and rear position. The shaft 6 is screw threaded at 42 as shown in Fig. 1, and mounted thereon by means of an internal screw thread is a shifting device 43 provided with arms 44 and 45.

Mounted in eyes 46ª extending from the journals 8 is a rod 46, which passes through a guide opening 47 in the arm 44, and serves as a guide for the shifting device 43. The upper end of the arm 44 is provided with inclined faces 48 and 49. As the shifting device 43 is moved to its extreme forward position by the rotation of the shaft 6 in the proper direction, the inclined face 48 contacts with the shoulder 50 on the latch 34 and lifts the latch 34 so as to release the pin 41 from the lock notch 39, and as the shifting device 43 is carried to the extreme rear position by the rotation of the shaft 6 in the opposite direction, the inclined face 49 contacts with the shoulder 51 on the latch 35 and lifts the latch 35 until the pin 41 is released from the lock notch 40. To the lower arm 45 is pivotally connected a slotted connecting member 52, the purpose of which will be hereafter explained. Between the shafts 6 and 2 is journaled in bearings 53, supported by the supporting plate 1, a shaft 54. This shaft is parallel to the shafts 6 and 2 and carries at its forward end a spur gear 55.

Mounted on the shaft 54 are collars 56. Rotatably mounted on the lever 29 is a roller 57. The lower end of the arm 29 is provided with a pin 58 which registers with the slot in the connecting member 52. On the outer end of the connecting member 52 is mounted a collar 59, which is secured thereto by the pin 60. A coil compression spring 61 is also mounted on the connecting member 52 so that the outer end thereof abuts against the collar 59. A sliding collar 62 is also mounted on the connecting member 52 and the inner end of the spring 61 abuts against this collar 62. The inner end of the collar 62 is provided with a projection 63 adapted to contact with the pin 58. The connecting member 52 is also provided with a shoulder 64, which limits the longitudinal movement of the collar 62 on the member 52 and keeps the spring 61 at a predetermined compression.

The operation of my device is as follows: Assuming the spring 16 to be tightly coiled and under compression and the parts in the position shown in Fig. 1, the lever 29 is forced forward until the pin 41 engages with the lock notch 39, securing the lever in the forward position. At the same time the spur gear 11 is forced into engagement with the spur gear 5 and the pawl 19 is released from the ratchet teeth 22 and leaving the spring 16 free to uncoil and communicate its power to the shaft 6, causing the rotation of this shaft, the gear 11, the gear 5 and the engine shaft 2. The rotation of the engine shaft is communicated to the engine and by this means the engine is started. As the spring 16 is unwound and the shaft 6 rotates, the shifting member 43 is moved forward until the inclined face 48 contacts with the shoulder 50 on the latch 34, forcing the lever upward and releasing the pin 41 from the lock notch 39. The spring 32 then shifts the lever 29 backward until the pin 41 is in engagement with the lock notch 40 on the latch 35. This movement of the lever forces the spur gear 11 backward and the spur gear 55 forward into the position shown in the dotted lines and into engagement with each other. The spur gear 55 at the same time being in engagement with the spur gear 4, the continued rotation of the shaft 2 under the power of the engine causes the rotation of the gear 11 in the opposite direction through the medium of the spur gear 55, and likewise the rotation of the shaft 6, resulting in the rewinding of the spring 16. At the same time the pawl 19 has been shifted by means of the spring 23 into engagement with the ratchet teeth 22 and the mechanism is reset. At the same time the shifting member 43 through the rotation of the shaft 6 is moved backward until it occupies the position shown in Fig. 1 as it is moved backward, the connecting member 52 compresses the spring 61, and when the parts are in the position shown in Fig. 1, the inclined face 49 of the arm 44 has been brought into contact with the shoulder 51 on the latch 35 and the latch lifted until the pin 41 is out of engagement with the lock notch 40. The spring 61 being a stronger and heavier spring than the spring 32 then quickly shifts the lever 29 into the position shown in Fig. 1, and the mechanism is again set and ready for operation.

Having described my invention, what I claim as new and desire to secure by Letters Patent is:—

1. The combination with a crank shaft carrying a driven gear, a second shaft having a power spring connected thereto, of a gear mounted on the said second shaft and adapted to be thrown into and out of engagement with said driven gear, a driving gear mounted on the crank shaft, intermediate gear mechanism adapted to be thrown in and out of engagement with said driving gear, and means for shifting the gear on said second shaft out of engagement with the driven gear on the crank shaft, and into and out of engagement with said intermediate gear mechanism.

2. The combination with a crank shaft carrying a driven gear, a second shaft having a power spring connected thereto, of a gear mounted on said second shaft, intermediate gear mechanism, a driving gear mounted on the crank shaft, and a lever connection between the intermediate gear mechanism and the gear on the second shaft, whereby the latter gear may be shifted out of engagement with the driven gear on the crank shaft and into engagement with said intermediate gear mechanism.

3. In an apparatus for starting explosive engines, the combination with a crank shaft carrying a driven gear, a second shaft having a power spring connected thereto, of a gear mounted on said second shaft, a driving gear mounted on said crank shaft, intermediate gear mechanism, manually operable means for throwing the intermediate gear mechanism into engagement with the driving gear and the gear on the second shaft into engagement with the driven gear, automatic means for shifting the gear on the second shaft out of engagement with the driven gear and into engagement with the intermediate gear mechanism and holding the same in such position until the power spring has been rewound, and means for automatically shifting the gear on the second shaft to a neutral position when the spring has been rewound.

In testimony whereof, I have signed my name to this specification in the presence of two subscribing witnesses, this 24th day of September 1906.

LEVIS MILLER BOOTH.

Witnesses:
B. A. ITTNER,
D. P. FOSTER.